(12) United States Patent
Faria

(10) Patent No.: US 6,460,361 B1
(45) Date of Patent: Oct. 8, 2002

(54) VEHICLE BEVERAGE DISPENSER

(76) Inventor: Sixdeniel Faria, R.R. 2 Box 41 S, Ulster, PA (US) 18850

( * ) Notice: Subject to any disclaimer, the term of this patent is extended or adjusted under 35 U.S.C. 154(b) by 0 days.

(21) Appl. No.: 09/844,767

(22) Filed: Apr. 27, 2001

(51) Int. Cl.⁷ .................................................. B60H 1/32
(52) U.S. Cl. ......................... 62/239; 62/394; 222/146.6
(58) Field of Search ........................... 62/239, 394, 395; 141/231, 351; 222/146.6, 185.1, 509

(56) References Cited

U.S. PATENT DOCUMENTS

| | | | |
|---|---|---|---|
| 2,610,485 | * | 9/1952 | Barr ............................ 165/145 |
| 3,558,013 | * | 1/1971 | Ponzo et al. .............. 222/146.2 |
| 4,034,571 | * | 7/1977 | Bollinger .................. 222/146.6 |
| 4,130,145 | | 12/1978 | Thomas |
| 4,140,150 | * | 2/1979 | Rundell ....................... 137/340 |
| 4,342,202 | * | 8/1982 | Knutson .................. 222/146.6 |
| 4,759,190 | | 7/1988 | Trachtenberg et al. |
| 5,435,151 | | 7/1995 | Han |
| D389,002 | | 1/1998 | Demore |
| 5,730,863 | * | 3/1998 | Howlings et al. ........... 210/109 |
| 5,819,541 | | 10/1998 | Tunkel et al. |
| 5,927,091 | | 7/1999 | Hong et al. |
| 5,983,988 | | 11/1999 | Hong |
| 6,076,706 | * | 6/2000 | Kritchman ............... 222/146.6 |

* cited by examiner

Primary Examiner—William E. Tapolcai

(57) ABSTRACT

A vehicle beverage dispenser for holding and dispensing a quantity of fluids within a vehicle. The vehicle beverage dispenser includes a container having a top wall, a bottom wall and a peripheral wall extending between the top and bottom walls. The top wall has an aperture therein extending into an interior of the container. The container is positioned in a vehicle. A conduit has a first end fluidly coupled to the container and positioned generally adjacent to the bottom wall. A second end is coupled to a valve for selectively opening and closing the second end of the conduit. The valve is mounted in the vehicle and is positioned at a lower height relative to the bottom wall of the container such that gravity draws fluid positioned in the container through the conduit and to the valve.

1 Claim, 3 Drawing Sheets

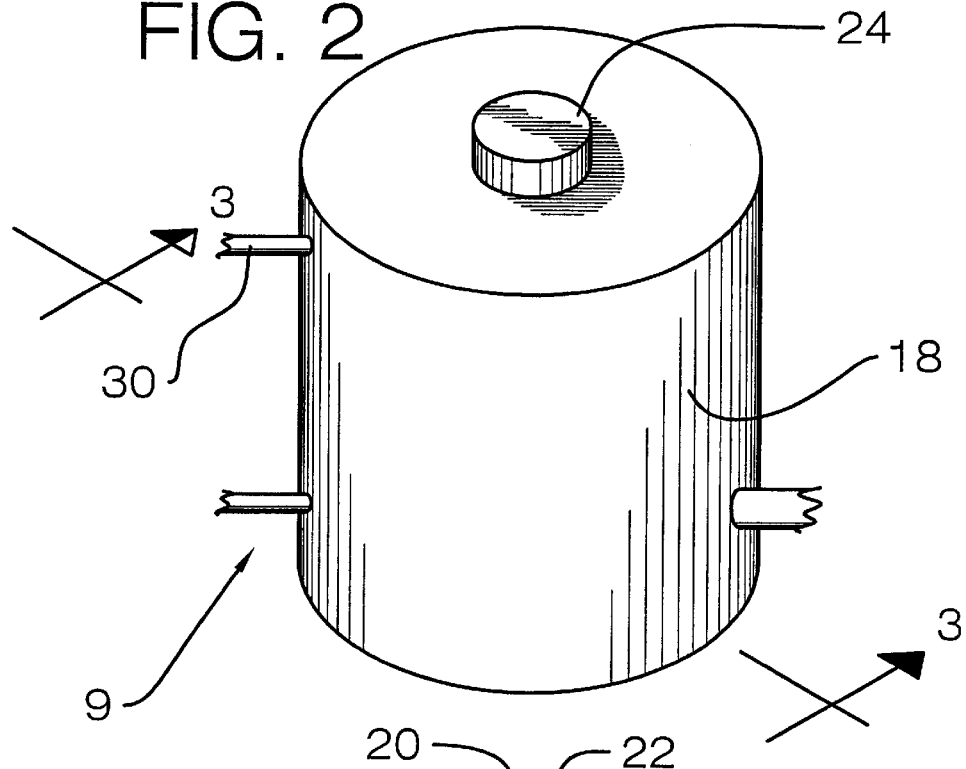
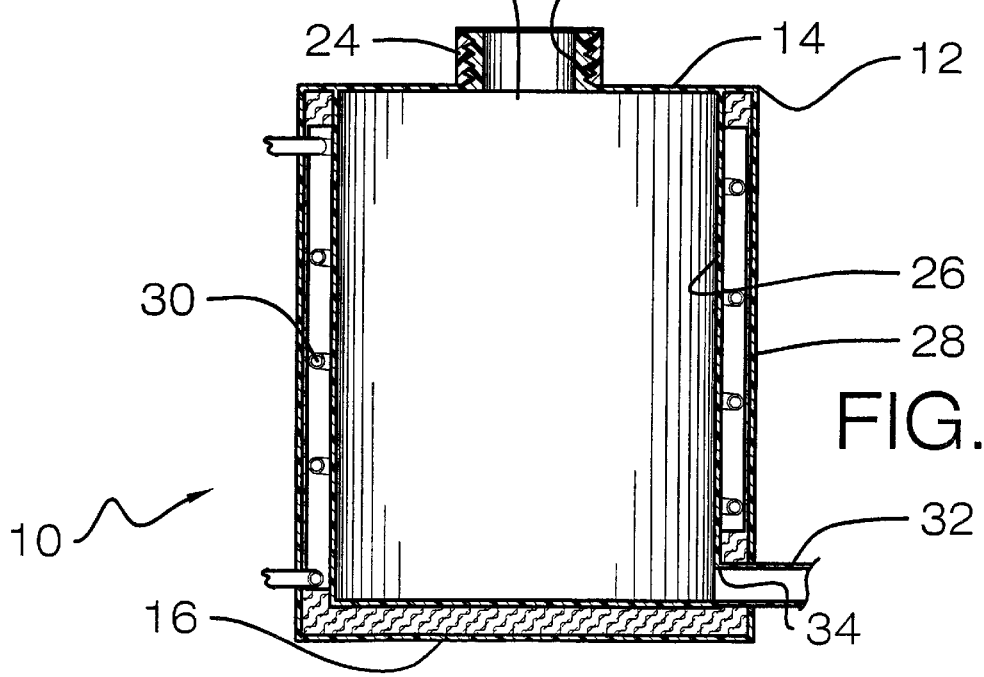

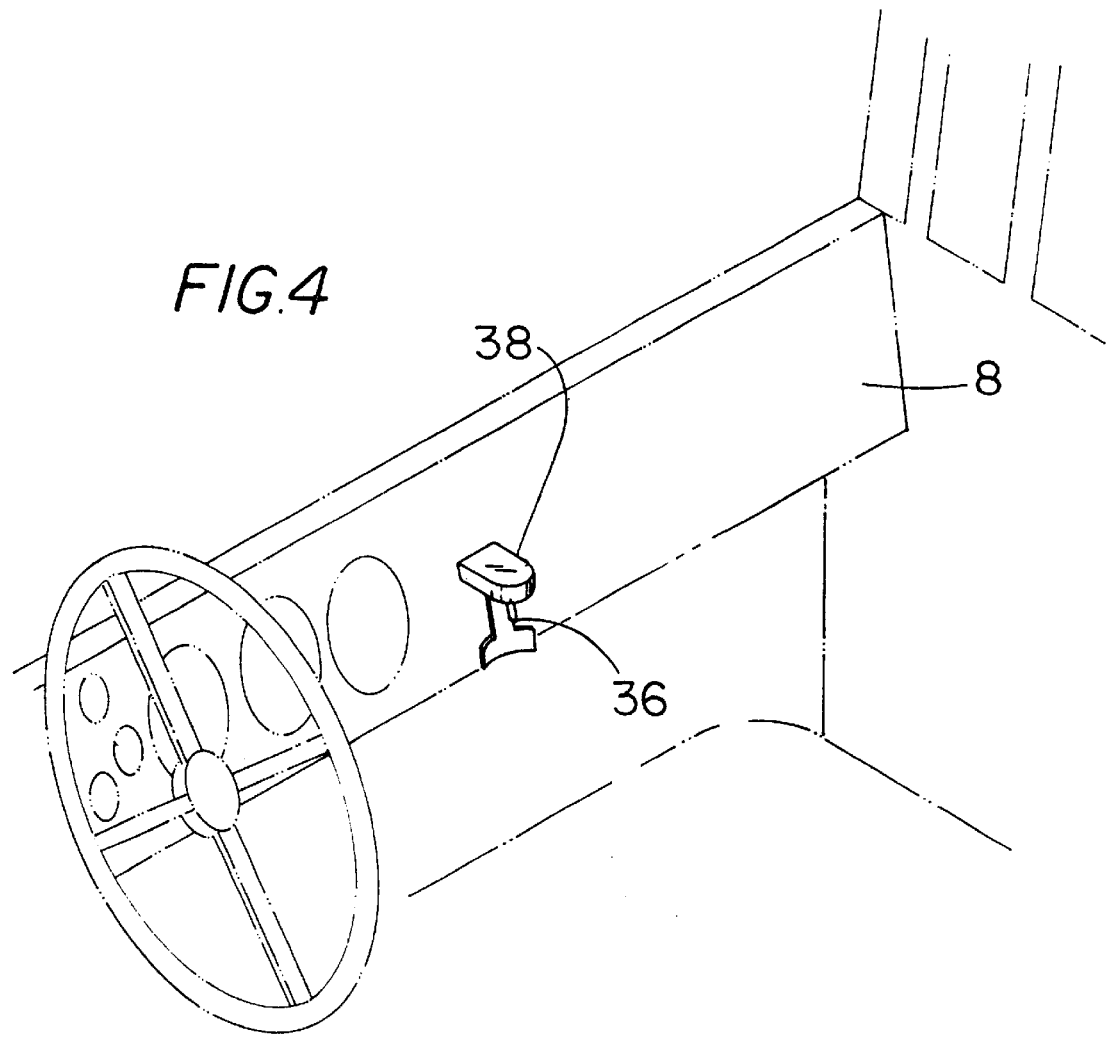

VEHICLE BEVERAGE DISPENSER

BACKGROUND OF THE INVENTION

1. Field of the Invention

The present invention relates to beverage dispensers and more particularly pertains to a new vehicle beverage dispenser for holding and dispensing a quantity of fluids within a vehicle.

2. Description of the Prior Art

The use of beverage dispensers is known in the prior art. More specifically, beverage dispensers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,130,145; U.S. Pat. No. 5,983,988; U.S. Pat. No. 5,435,151; U.S. Pat. No. 5,927,091; U.S. Pat. No. 5,819,541; U.S. Pat. No. 4,759,190; and U.S. Des. Pat. No. 389,002.

While these devices fulfill their respective, particular objectives and requirements, the aforementioned patents do not disclose a new vehicle beverage dispenser. The inventive device includes a container having a top wall, a bottom wall and a peripheral wall extending between the top and bottom walls. The top wall has an aperture therein extending into an interior of the container. The container is positioned in a vehicle. A conduit has a first end fluidly coupled to the container and positioned generally adjacent to the bottom wall. A second end is coupled to a valve for selectively opening and closing the second end of the conduit. The valve is mounted in the vehicle and is positioned at a lower height relative to the bottom wall of the container such that gravity draws fluid positioned in the container through the conduit and to the valve.

In these respects, the vehicle beverage dispenser according to the present invention substantially departs from the conventional concepts and designs of the prior art, and in so doing provides an apparatus primarily developed for the purpose of holding and dispensing a quantity of fluids within a vehicle.

SUMMARY OF THE INVENTION

In view of the foregoing disadvantages inherent in the known types of beverage dispensers now present in the prior art, the present invention provides a new vehicle beverage dispenser construction wherein the same can be utilized for holding and dispensing a quantity of fluids within a vehicle.

The general purpose of the present invention, which will be described subsequently in greater detail, is to provide a new vehicle beverage dispenser apparatus and method which has many of the advantages of the beverage dispensers mentioned heretofore and many novel features that result in a new vehicle beverage dispenser which is not anticipated, rendered obvious, suggested, or even implied by any of the prior art beverage dispensers, either alone or in any combination thereof.

To attain this, the present invention generally comprises a container having a top wall, a bottom wall and a peripheral wall extending between the top and bottom walls. The top wall has an aperture therein extending into an interior of the container. The container is positioned in a vehicle. A conduit has a first end fluidly coupled to the container and positioned generally adjacent to the bottom wall. A second end is coupled to a valve for selectively opening and closing the second end of the conduit. The valve is mounted in the vehicle and is positioned at a lower height relative to the bottom wall of the container such that gravity draws fluid positioned in the container through the conduit and to the valve.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle beverage dispenser apparatus and method which has many of the advantages of the beverage dispensers mentioned heretofore and many novel features that result in a new vehicle beverage dispenser which is not anticipated, rendered obvious, suggested, or even implied by any of the prior art beverage dispensers, either alone or in any combination thereof.

It is another object of the present invention to provide a new vehicle beverage dispenser which may be easily and efficiently manufactured and marketed.

It is a further object of the present invention to provide a new vehicle beverage dispenser which is of a durable and reliable construction.

An even further object of the present invention is to provide a new vehicle beverage dispenser which is susceptible of a low cost of manufacture with regard to both materials and labor, and which accordingly is then susceptible of low prices of sale to the consuming public, thereby making such vehicle beverage dispenser economically available to the buying public.

Still yet another object of the present invention is to provide a new vehicle beverage dispenser which provides in the apparatuses and methods of the prior art some of the advantages thereof, while simultaneously overcoming some of the disadvantages normally associated therewith.

Still another object of the present invention is to provide a new vehicle beverage dispenser for holding and dispensing a quantity of fluids within a vehicle.

Yet another object of the present invention is to provide a new vehicle beverage dispenser which includes a container having a top wall, a bottom wall and a peripheral wall extending between the top and bottom walls. The top wall has an aperture therein extending into an interior of the container. The container is positioned in a vehicle. A conduit has a first end fluidly coupled to the container and positioned generally adjacent to the bottom wall. A second end is coupled to a valve for selectively opening and closing the second end of the conduit. The valve is mounted in the vehicle and is positioned at a lower height relative to the bottom wall of the container such that gravity draws fluid positioned in the container through the conduit and to the valve.

Still yet another object of the present invention is to provide a new vehicle beverage dispenser that utilized a vehicles air conditioning system to cool beverages contained within the container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic perspective view of the present invention.

FIG. 3 is a schematic cross-sectional view taken along line 3—3 of FIG. 2 of the present invention.

FIG. 4 is a schematic perspective view of the present invention.

DESCRIPTION OF THE PREFERRED EMBODIMENT

Figure 1:
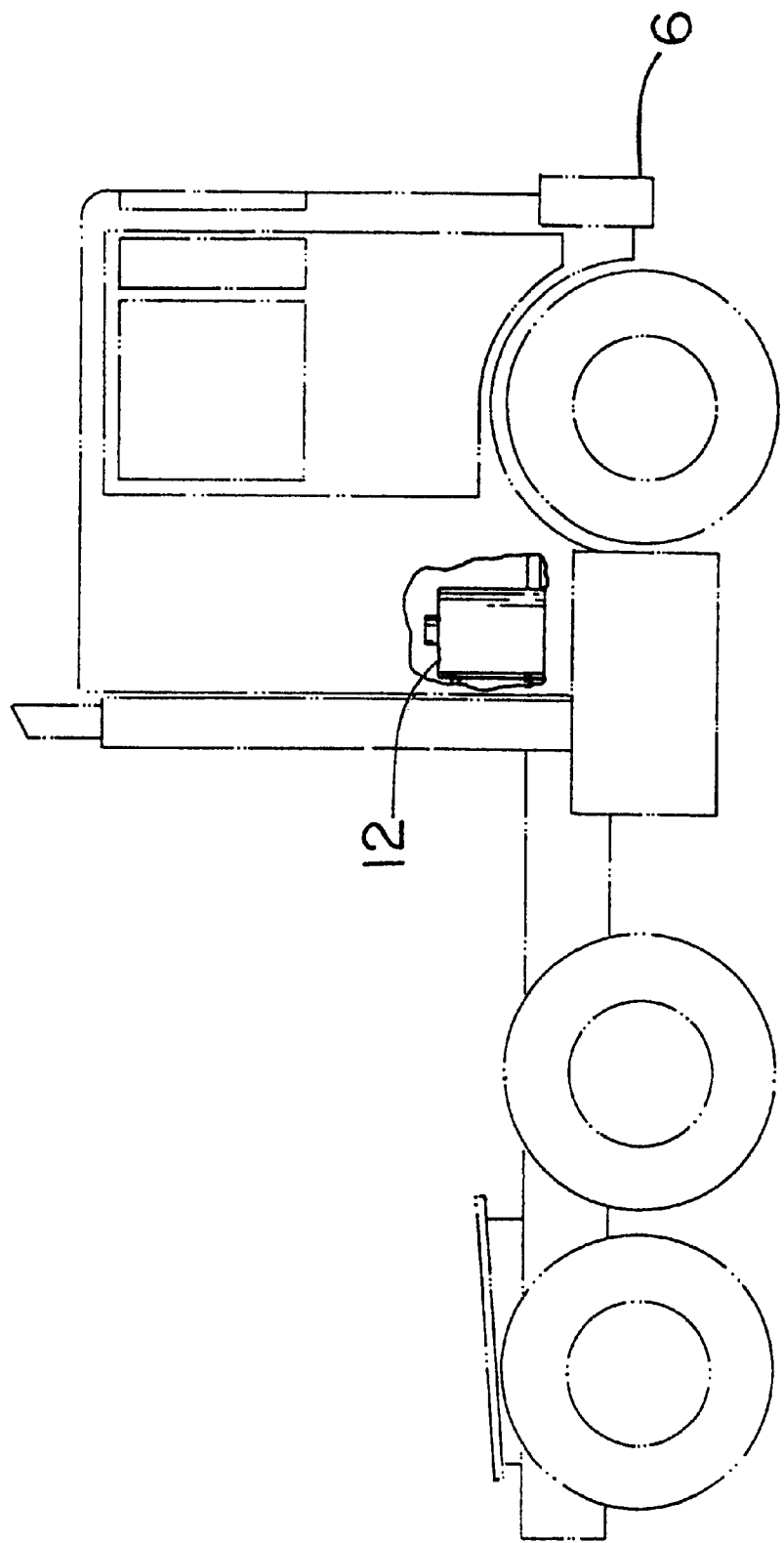
FIG. 1 is a schematic side view of a new vehicle beverage dispenser according to the present invention.

With reference now to the drawings, and in particular to FIGS. 1 through 4 thereof, a new vehicle beverage dispenser embodying the principles and concepts of the present invention and generally designated by the reference numeral 10 will be described.

As best illustrated in FIGS. 1 through 4, the vehicle beverage dispenser 10 generally comprises a device for positioning in a vehicle. The vehicle 6 has a dashboard 8 and a conventional air conditioning system 9. The device 10 includes a container 12 having a top wall 14, a bottom wall 16 and a peripheral wall 18 extending between the top 14 and bottom 16 walls. The top wall 14 has an aperture 20 therein extending into an interior of the container 12. An annular lip 22 extends upwardly from an edge of the aperture 20. The lip 22 is threaded. A cap 24 is positionable over the aperture 20 and is adapted for threadably coupling to the lip 22. The container 12 is positioned in the vehicle 6. The peripheral wall 18 is substantially hollow and has an inner wall 26 and an outer wall 28. The container 12 is in thermal communication with the air conditioning system. The air conditioning system includes a coolant carrying pipe 30 extending through outer wall 28, winding about the inner wall 26 and extending outwardly through the outer wall 28 for circulating the coolant about the inner wall 26.

A conduit 32 has a first end 34 fluidly coupled to the container 12 and positioned generally adjacent to the bottom wall 16. A second end 36 of the conduit 32 is coupled to a valve 38 for selectively opening and closing the second end 36 of the conduit 32. The valve 38 is mounted on the dashboard 8 and is positioned at a lower height relative to the bottom wall 16 of the container 12 such that gravity draws fluid positioned in the container 12 through the conduit 32 and to the valve 38.

In use, the container 12 is positioned in the vehicle 6 and placed in communication with a pipe containing coolant in fluid communication with the air conditioning system of the vehicle. The coolant cools any fluid contents have been poured into the container. The valve 38 is opened when a user wishes to receive fluid from the container 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fluid dispensing device for positioning in a vehicle, the vehicle having a dashboard and an air conditioning system, said device comprising:

a container having a top wall, a bottom wall and a peripheral wall extending between said top and bottom walls, said top wall having an aperture therein extending into an interior of said container, an annular lip extending upwardly from an edge of said aperture, said lip being threaded, a cap being positionable over said aperture and being adapted for threadably coupling to said lip, said container being positioned in said vehicle, said peripheral wall being substantially hollow and having an inner wall and an outer wall, said container being in thermal communication with said air conditioning system, said air conditioning system including a pipe extending through said outer wall, winding about said inner wall and extending outwardly through said outer wall for circulating a coolant about said inner wall; and a conduit having a first end fluidly coupled to said container and positioned generally adjacent to said bottom wall, a second end being coupled to a valve for selectively opening and closing said second end of said conduit, said valve being mounted on said dashboard and being positioned at a lower height relative to said bottom wall of said container such that gravity draws fluid positioned in said container through said conduit and to said valve.

* * * * *